United States Patent [19]

Mumford

[11] Patent Number: 4,703,365
[45] Date of Patent: Oct. 27, 1987

[54] LINEAR IMAGE SENSOR HAVING SOME PARTS SELECTIVELY READ OR DISABLED

[75] Inventor: Ronald W. J. Mumford, Hitchin, England

[73] Assignee: Rank Cintel Ltd., England

[21] Appl. No.: 824,183

[22] Filed: Jan. 30, 1986

[30] Foreign Application Priority Data

Feb. 7, 1985 [GB] United Kingdom ............... 8503169

[51] Int. Cl.$^4$ ............................................. H04N 1/40
[52] U.S. Cl. .................................. 358/293; 358/294; 358/213.13; 358/213.26
[58] Field of Search .............................. 358/293–294, 358/213, 212, 180

[56] References Cited

U.S. PATENT DOCUMENTS

| 4,205,337 | 5/1980 | Millward | 358/54 |
| 4,249,217 | 2/1981 | Korte et al. | 358/213 |
| 4,275,422 | 6/1981 | Le Couteur | 358/214 |
| 4,426,664 | 1/1984 | Nagumo et al. | 358/213 |
| 4,459,619 | 7/1984 | Yoshida | 358/213 |
| 4,476,493 | 10/1984 | Poetsch et al. | 358/214 |

FOREIGN PATENT DOCUMENTS 2007935 5/1979 United Kingdom .

OTHER PUBLICATIONS

Rundfunktechnische Mitteilungen, vol. 28, No. 1, 1984, Hamburg, plus translation of Section 4.

Primary Examiner—Gene Z. Rubinson
Assistant Examiner—Stephen Brinich
Attorney, Agent, or Firm—Ostrolenk, Faber, Gerb & Soffen

[57] ABSTRACT

The sensor 12 of a telecine projector is a charge coupled device and comprises a line of photo-sensitive elements 42 and a line of associated storge elements 44. An image form cinematographic film generates packets of charge in the elements 42 when focussed on the sensor. The charge packets may be transferred to the storage elements 44. The packets may then be shifted along the line of storage elements for reading (in serial form) by control circuitry 24. Reading takes place through an output port 26 at the end of the line.

A switch 28 enables the two halves of the line to be disconnected, so that signals from only the lower half of the array can be read through the port 26, the signals from the upper half being discarded into a current sink. This reduces the clock frequency necessary to read out the signals in a set time, and enables the array to cope with normal, wide angle or anamorphic film stock.

4 Claims, 5 Drawing Figures

LINEAR IMAGE SENSOR HAVING SOME PARTS SELECTIVELY READ OR DISABLED

FIELD OF THE INVENTION

The present invention relates to line array sensors for telecine projectors. Such projectors project images from cinematographic film onto the sensor which comprises a line of photoelectric elements for encoding the image as an electrical signal. The signal is then processed to produce a video signal suitable for feeding to a television monitor for display, or, more especially, for transmission over a broadcasting network, or for storage for later display or transmission.

BACKGROUND OF THE INVENTION 35 mm film is commonly used in cinematography, and several image formats for use with it are well known. These are defined by the aspect ratio of the image, namely the ratio of the width of the frame to its height. The frame height is normally slightly less than the frame pitch, which is the distance along the length of the film from the top of one frame to the top of the next (and is the same for all three formats). "Normal" 35 mm film uses frames with an aspect ratio of about 1.33. This matches the aspect ratio of a television picture. "Wide-angle" film uses a frame aspect ratio of about 1.85, so that for the same picture height on the projection screen, the wide-angle film format gives a wider picture than the normal film format. Accordingly, some of the image is lost when displayed on the television screen. On the film, the frame has the same width as for normal film but has reduced height. "Anamorphic" film provides an alternative format for producing a wide picture, and in this case the projected picture has an aspect ratio of about 2.35 to 1. The frame height on the film is nearly equal to the frame pitch. The width of the frame on the film, however, is very nearly equal to the frame width used in normal and wide-angle film. The resulting frame on the film has the lowest aspect ratio of the three formats, being about 1.2 to 1. However, cameras used to film in the anamorphic format include in their optical system a cylindrical lens element which has the effect of compressing the image in the horizontal direction, while leaving it unaffected in the vertical direction. The compression ratio is typically 2:1. Thus, a circle is recorded on the film as an ellipse with its major axis running vertically. Compensation for the horizontal compression of the image during filming is provided during optical projection by another cylindrical lens element, to produce a wide picture on the screen having a higher aspect ratio than either wide-angle or normal format film provides.

It may be required, at various times, to broadcast film in any of the three formats, and it is clearly desirable that the same telecine projector should be able to handle all three formats with the minimum of alteration or adjustment.

When a video signal is produced from wide-angle or anamorphic film stock, special steps have to be taken to produce a picture for display with the television aspect ratio of 1.33 to 1. For the most part this means that only part of the film picture is used, and the portion selected is panned across the film frame as required to follow the action in the scene. Part of the filmed image on one or both side edges of the picture will be lost, and in the case of anamorphic film this amounts to about half the total image width. [For certain parts of the film, e.g. the title and credits, it may be preferred to televise the whole width of the film picture with black bands at the top and bottom of the video picture; or to distort the video picture by horizontal compression to give a 1.33 aspect ratio without losing any picture information.]

The preferred embodiment of the invention, described below, is of the type using an image sensor comprising a charge coupled device (CCD). Charge coupled devices are a recent development in solid state semiconductor techniques and are well suited to image sensing roles.

Packets of charge may be created at various sites in the device (a semiconductor wafer) by incident light, and the rate of charge generation is linearly related to the incident light intensity. Accordingly, when an image is incident on the device, the image generates, at each site, a packet of charge whose size represents the image intensity at that site. The packets of charge may be moved from site to site through the device, to a suitable output terminal where they are read one by one.

In addition to photo-sensitive sites, the device will usually comprise a shift register formed by sites not sensitive to light. Packets of charge are transferred in parallel from the photosensitive sites to respective sites of the shift register, and are then shifted along the register to be read out in serial form at one end of the register. Each photo-sensitive site and the corresponding non-sensitive site form what is referred to below as a cell. The resulting electrical signal can be processed to produce a standard video signal representing the image falling on the charge coupled device.

It is the linear relation between light intensity and the rate of electron production, and the ease of moving electron packets through the device which make charge coupled devices well-suited to image sensing roles. However, three factors combine to make it difficult to design a telecine projector which uses a charge coupled device as a sensor and which can be used with all three film formats described above. Firstly, a large number of sensing points are required, especially with anamorphic film, to obtain a satisfactory resolution in the final television picture. Secondly, the time available for making an exposure and reading out the results is limited, being dependent on the time for which an individual frame is projected. Finally, there is a maximum rate at which signals can be read from the charge-coupled device. This rate is governed in part by the speed with which charge packets may efficiently be moved through the device, and primarily by the rate at which the output amplifier of the device can process signals.

SUMMARY OF THE INVENTION

The present invention provides a telecine projector sensor comprising a line of photo-sensitive cells onto which a film image may be projected to generate a signal within each cell representing the portion of the image falling on that cell, means operable to shift the signals along the line towards an output port at the end of the line, through which the signals may be read in serial form, and disconnecting means operable to connect or disconnect a portion of the line array away from the output port from a portion of the line adjacent the output port, to allow signals to be read from the cells of the whole line or only from cells of the adjacent portion.

The ability to change the effective length of the line means the number of cells from which signals must be read can be reduced when wide angle or normal film stock is being used, so that redundant signals from sensors used only for encoding anamorphic images are not read. The decrease in the number of cells to be read reduces to an acceptable value the rate at which signals must be read, as will be explained below, and enables the same sensor to be used with all three types of film.

Further aspects of the invention are set out in the subsidiary claims below, to which reference should now be made.

The preferred embodiment of the invention incorporates a charge coupled device having a line of photosensitive cells. The line of cells or linear array is used to scan consecutive horizontal bands of the projected image in sequence, to generate, from each scan, a signal from which a video signal for one line of the final television image may be derived. Such devices are currently available with 1024 or 2048 cells for example. The controlling voltage used to shift charge packets through the device is limited to a maximum clock frequency of about 10 MHz in order to obtain efficient charge transfer between adjacent sites. That is, the maximum number of times a single charge packet may be moved in a second is about $10 \times 10^6$. This limit can be approximately doubled by constructing the CCD with two shift registers and arranging for signals from alternate photosensitive sites to be transferred into alternate registers. The signals are transported along the registers in parallel, to respective output ports, so that two signals can be read in each clock period. Thus, the rate at which signals are read out (the "data rate") is twice the clock rate. In view of this limit on the clock frequency, some straightforward calculations, given below, show the difficulty of designing a telecine projector using current CCD technology in the sensor, and capable of handling film in all three formats.

The pitch between frames for 35 mm film is approximately 19 mm. The height of the picture information in a frame of wide angle film is approximately 11.2 mm. If the film is run at 25 frames/second (the picture rate of European television systems) then all the picture information in one frame passes over the sensor in a time T, where:

$$T = \frac{1}{\text{Frame/sec.}} \times \frac{\text{frame height}}{\text{frame pitch}} = \frac{1}{25} \times \frac{11.2}{19} = 23.58 \text{ ms}$$

In order to generate a standard PAL television signal, which has 576 lines of image per picture, 576 scans of the CCD sensor must occur during the time T. The maximum scan time per line is therefore (23.58/576) ms, i.e. 41 μs. Control functions such as transferring signals to the shift registers require about 2 μs per line, and so the time available to scan the line of cells is about 39 μs.

Standard sensors with nominally 1024 cells also include extra cells for use in connection with data readout and the like, and hence the number of signals to be read out in each line of data is 1044. The data rate for the sensor therefore needs to be 1044/39 μs = 26.77 MHz.

The film speed (i.e. the frame rate) is sometimes increased, to condense the running time of a film, in which case the data rate needs to be higher still. Taking all this into account, a sensible data rate to use would be about 30 MHz which is considerably greater than the maximum acceptable rate. (When the sensor is constructed to form two parallel shift registers, the requirement for a data rate of 30 MHz becomes equivalent to a requirement for a clock rate of 15 MHz).

By contrast, a sensor with 720 elements, which is the number of samples per line proposed by the European Broadcasting Union for digital television systems, would require a data rate of (720+20)/39 = 18.97 MHz. Even an increase of 5% in the film speed does not result in a data rate above 20 MHz (or, equivalently, the increase does not result in clock rates over 10 MHz for sensors having two shift registers).

The anamorphic film format produces a screen image with a very large aspect ratio. In order to display the full height of the image on the television screen, which has an aspect ratio of 1.33, only half of the width of each film frame is in fact displayed on the television screen. Hence, if a 1024 cell sensor is used, only 512 of the 1024 cells are used to produce the television picture. Any adjacent 512 cells may be used, depending on where action is taking place in the frame. If 720 elements are required per line, then a sensor having at least 1440 cells must be used to enable the required video bandwidth to be achieved.

The unused film between frames of anamorphic film is negligibly small, and so the time available for scanning a line of anamorphic film becomes $1/25 \times 1/576 = 69$ μs per line. Allowing 2 μs for control functions, as above, and with the required extra cells included in the CCD device, the data rate for a 1024 cell device becomes 1044/67 = 15.58 MHz. For a device with 1440 cells, the rate is 21.8 MHz, which is just acceptable with current technology.

However, if a wide angle film is projected onto a 1440 cell array, the required rate becomes 1460/39 = 37.4 MHz. Allowing for a 5% increase in film speed, the rate becomes 39.3 MHz, which is far higher than is acceptable with current technology.

Normal film has a frame height of 15.6 mm and consequently, when projected onto a 1440 cell line, requires a data rate of 27.5 MHz.

These calculations present a considerable problem to the designer of telecine projectors who wants to use the same sensor for anamorphic, normal and wide angle film. We have appreciated that the problem arises because data is read out from the CCD device in serial form, so that when a wide angle or normal film is being projected only onto a predetermined portion of the line, the whole array must still be read, even though it is known in advance which of the data will not be used. By enabling part of the line of cells to be disconnected, in accordance with the present invention, only the cells actually in use need be read. The effective shortening of the line reduces the required data rate to an acceptable one. With means for disconnecting half of the line, a 1440 cell sensor can become equivalent to a 720 cell sensor, and the data rate required for scanning a wide angle or normal film projected onto the 720 cells becomes 18.97 MHz and 13.9 MHz respectively.

BRIEF DESCRIPTION OF THE DRAWINGS

The present invention will now be described in more detail by reference to the accompanying drawings, which show an embodiment of the invention, by way of example, and in which.

DESCRIPTION OF THE PREFERRED EMBODIMENT

Figure 1:
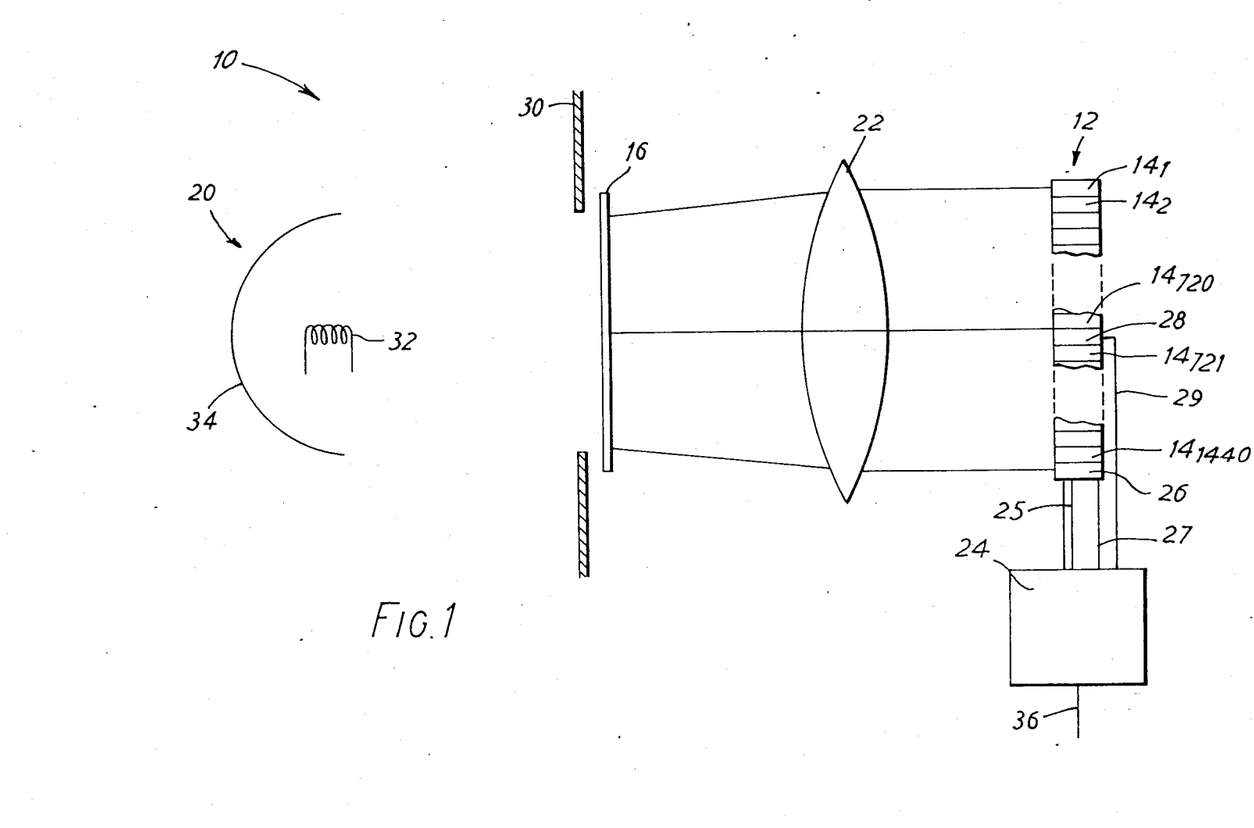
FIG. 1 is a schematic plan view of a telecine projector incorporating a sensor according to the invention.

Referring to FIG. 1, the telecine projector 10 comprises a CCD sensor 12. When colour film is being projected, the projector will comprise three sensors and means for splitting the projected light into its red, green and blue components and directing those components to respective sensors. However, for reasons of clarity, only a single sensor is shown in the drawings. This arrangement is suitable for use with black and white film. A further sensor is sometimes used, to which the infra red component of the light is directed. This is used to detect dust and scratches on the film, in a known manner.

The sensor 12 comprises a line of photo-sensitive cells $14_1, 14_2 \ldots 14_n \ldots 14_{1440}$. An image from a frame of film 16 may be projected onto the sensor 12 by means of a light source and a lens system 22, both of which are shown schematically. A projected image generates a signal within each cell 14 representing the portion of the image falling on that cell. Control circuitry 24 sends signals controlling operation of the sensor 12 over the connection 25 and is operable to shift the generated signals along the line array towards an output port 26 provided at the end of the line of cells 14. The signals arrive at the output port 26 one after the other, and so may be read in serial form. Disconnecting means 28 is provided half way along the line between cells $14_{720}$ and $14_{721}$ and comprises an electronic switch which can connect the two halves of the line together to form a single line array sensor, or disconnect the two halves and discard signals from the half away from the output port 26 (cells $14_1$ to $14_{720}$) into a current sink, thereby forming a shorter line. The output port 26 is connected to the control circuitry 24 by a connection 27. The state of the electronic switch 28 is controlled by the control circuitry 24 over a connection 29, so that the circuitry can read signals from the whole of the line, or from the half adjacent the port 26 (cells $14_{721}$ to $14_{1440}$) depending on the state of the switch 28. The structure of output ports for charge coupled devices is well known in the art.

The film 16 for projection passes over a light gate 30 which is illuminated by the light source 20. The light source 20 is shown as comprising a bulb 32 and a reflector 34. In practice it will usually also include a condensor lens system. The detailed construction of a suitable light source form no part of the invention, and will be well understood by those skilled in the optics of telecine projectors.

Light passing through the film 16 is collected by the lens system 22 and focussed onto the sensor 12. The lens system 22 is shown as a single bi-convex lens, but will usually be more complex in practice. Again, the details of construction of a suitable lens system form no part of the present invention, and are well known to those in the art.

Only light from a horizontal band across the film falls on the line of cells 14 at any one time. The light generates signals representing that band. Each signal is a packet of electrical charge whose size is proportional to the light intensity on the cell and to the exposure time. After an exposure time of suitable length, these signals are read by the control circuitry 24 by shifting them along the line of cells in a manner to be described in more detail later, to the output port 26. The circuitry 24 processes the signals which have been read, to generate a video signal representing the band of the image which gave rise to the signals. The resulting video signal is provided at an output terminal 36.

After movement of the film 16, a different horizontal band of the image falls on the sensor, and the above signal generation, reading and processing takes place with respect to this different band, to generate a further video signal at the output 36.

After a large number of such scans (576 when a 625 line PAL television signal is being produced) video signals representing a complete television picture will have been provided at the output 36.

Figure 2:
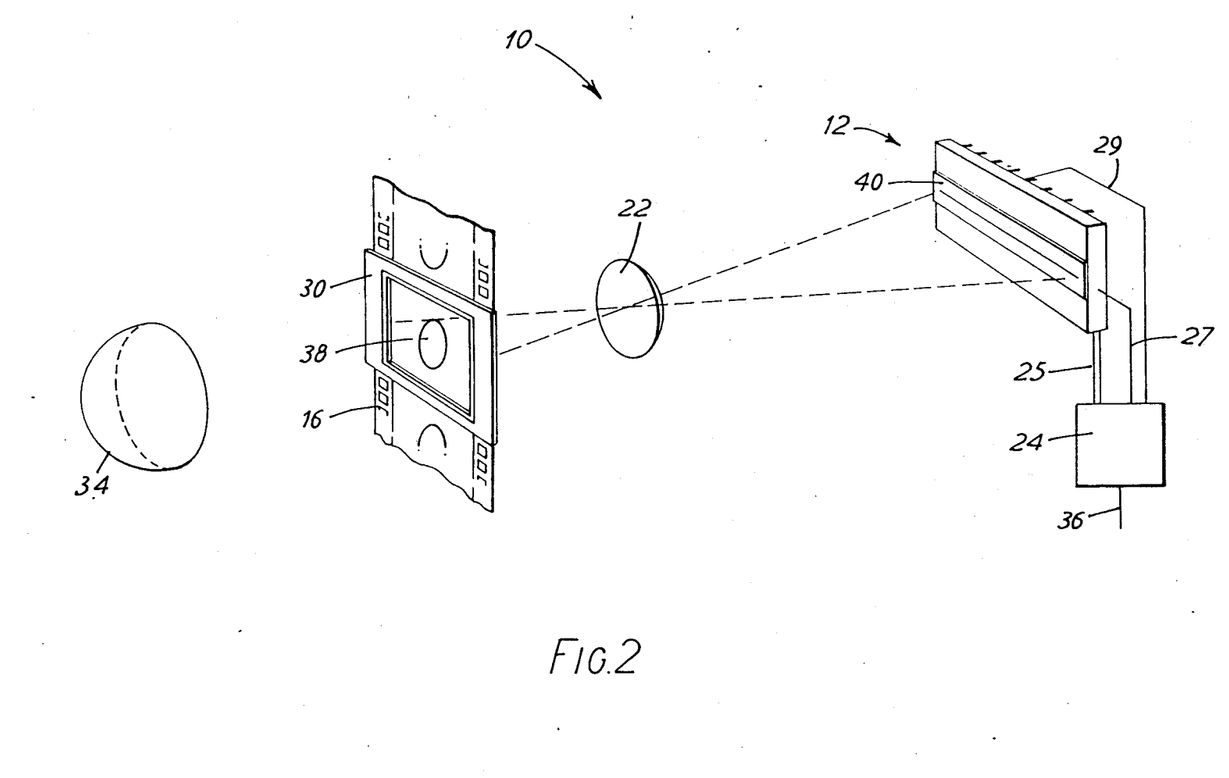
FIG. 2 is a simplified perspective view, partly schematic, of the projector of FIG. 1 in use with anamorphic film.

Turning to FIG. 2, the projector is shown in use, with anamorphic film 16 at the film gate 30. The anamorphism is indicated by an elliptical image 38 shown on the film and formed by a circular object, as discussed above.

The line of photo-sensitive cells of the sensor 12 are located behind a window 40 in the device, which is shown built into a standard DIL integrated circuit package. It is not necessary to correct the anamorphism of the film 16 during projection, because the image is sampled line by line, so that the vertical height of the image is not important. The magnification of the lens system 22 is adjusted so that the focused image falls on the sensor 12 along the whole length of the line of cells. Accordingly, the switch 28 connects the two halves of the line together and the port 26 (not shown in FIG. 2) is used to read from the whole length of the line.

As shown above, the data rate required in this case is 21.8 MHz, which is just acceptable with current CCD technology. The subsequent processing of the signals read from the cells is more complex when anamorphic film is being projected, than when normal or wide angle film is projected (to be described below) because only half of the image is used for the final television picture. After the signals from the whole line of the cells have been read by the circuitry 24, half are discarded. The remainder (which may be signals from any 720 consecutive cells of the line) are used to generate a video signal. The selection is conveniently performed by loading all of the signals into a memory device, and then reading the selected 720 signals, as described below with reference to FIG. 5.

Figure 3:
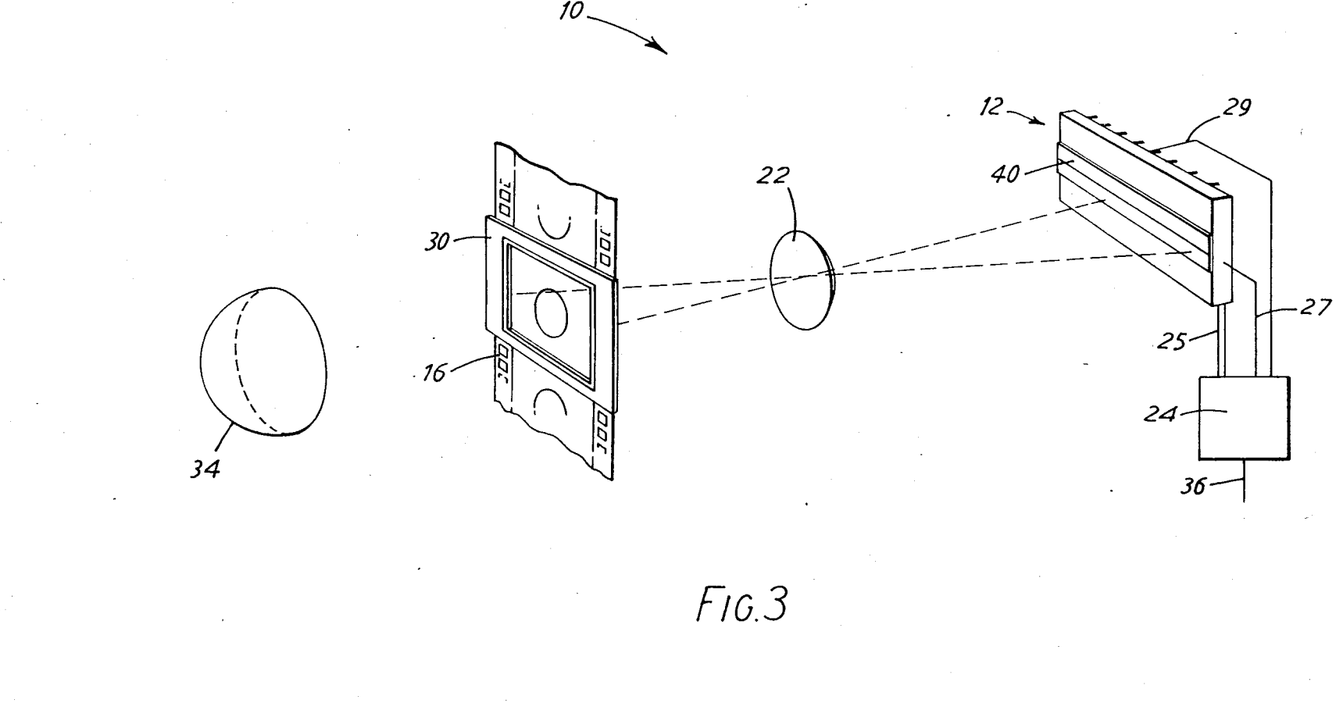
FIG. 3 is a view like FIG. 2, of the projector in use with normal film.

It has also been shown above that if wide angle or normal film is projected onto 720 cells of the sensor 12, the data rate required for reading out the signals from all 1440 cells in the available time is unsatisfactorily high. Accordingly, as shown in FIG. 3, when wide angle and normal film is being projected, only half of the cells 14 are used and read. For this to be achieved, the magnification of the lens system 22 is adjusted so that the whole width of the film frame is projected onto half of the cells (cells $14_{721}$ to $14_{1440}$).

The control circuit changes the state of the switch 28 so that signals from the cells $14_1$ to $14_{720}$ are discarded into a current sink, and so that only signals from cells $14_{721}$ to $14_{1440}$ can be read through the port 26. With the optical system and switch thus set up, image encoding may begin. Disconnecting half of the array halves the length of the line of cells for the purposes of clock frequency and data rate calculations, and reduces the required data rate to 18.97 MHz, (for wide angle film) or 13.9 MHz (for normal film) which are acceptable with current CCD technology. Although 720 cells are read when wide-angle stock is being projected, the aspect ratio of wide-angle film means that signals representing part of the width of the image must be discarded. The discard is performed in the same way as with anamorphic film, as will be described below.

Figure 4:
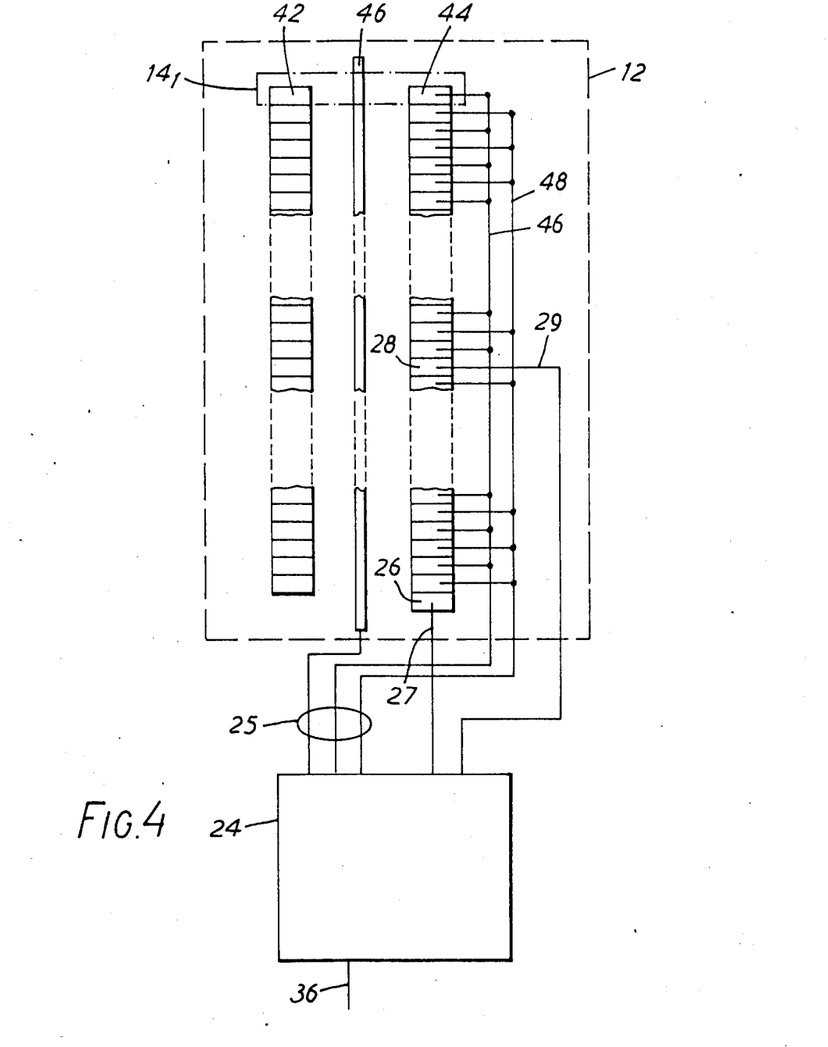
FIG. 4 is a schematic view showing the sensor of FIGS. 1 to 3 in more detail.

FIG. 4 shows schematically the sensor 12 in more detail. Each cell is of the same construction, and so only one ($14_1$) need be described. The cell 14 comprises a photo-sensitive element 42 (a photodiode) and a storage element 44 which is part of a shift register. The storage elements of all the cells are shown in FIG. 4 forming a single shift register, although preferably they form two registers as described above, each with its own output port 26, the elements of alternate cells forming part of alternate shift registers. A single shift register is shown in FIG. 4 for simplicity. Since the sensor 12 is a charge coupled device, the photo-sensitive element 42 and the storage element 44 are both sites in a semiconductor wafer.

An electrode system 46, to which voltages are applied by the circuitry 24, enables the circuitry 24 to control the transfer of a charge packet from the element 42 to the element 44. The action of the electrode system 46 is common to all of the cells 14, so that under the control of the circuitry 24, the signals generated by a projected image in the photo-sensitive elements of all of the cells 14 may be transferred simultaneously to the corresponding storage elements. The circuitry 24 also applies voltages to two further electrode systems 46,48. These voltages control the transfer of charge packets along the shift registers formed by the storage elements of the cells. Repeated application of the voltage patterns required to effect such transfer causes the signals stored in the storage elements of the cells to be shifted along the line of cells to the output port 26. Of course, the signals in the elements of the cells $14_1$ to $14_{720}$ may never reach the port 26, being discarded into a current sink by the switch 28.

The act of transferring a packet of charge from the photosensitive element 42 to the storage element 44 zeros the element 42, since the potential well forming the element 42 is emptied of charge by the transfer. Therefore, scanning of the next band of the image can begin as soon as transfer to the storage elements is complete. Thus, signals generated by one band of the image are read out of the sensor at the same time as the next band of the image is generating further signals in the photo-sensitive elements.

Figure 5:
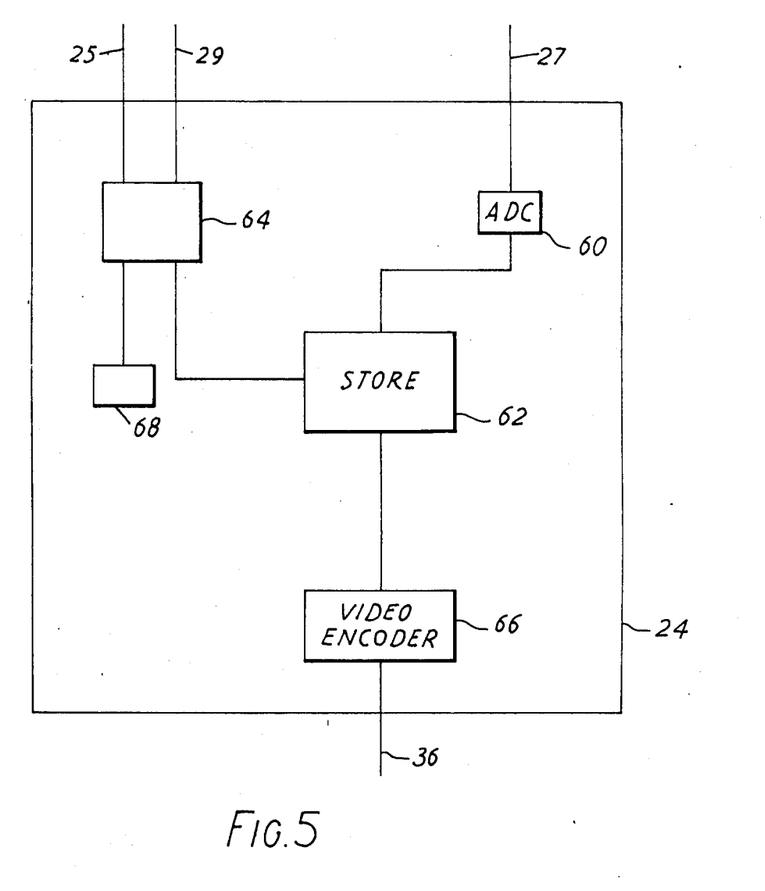
FIG. 5 shows a control circuit of the sensor in more detail.

The control circuit 24 and its operation is described in more detail in FIG. 5. Signals read from the output port 26 arrive over the connection 27 and are digitally encoded by an analogue-to-digital converter 60, before being stored in a store 62. Stored signals are read out of the store 62 under the control of circuit 64, and are fed to circuit 66 which generates a standard video signal from the stored signals. The video signal is provided at the output 36.

The circuit 64 not only controls the reading of data from the store 62, but also controls the shifting of signals through the sensor, by means of the connection 25, and the state of the switch 28, by means of the connection 29.

When normal or wide-angle film is being encoded, the circuit 64 sets the switch 28 to disconnect the two halves of the line of cells.

Signals representing a line of the image (720 in number) arrive over the connection 27, and are stored as they arrive in the store 62 in place of the signals representing the previous image line (if any). In the case of normal film, the circuit 64 commands all 720 signals to be read out to the video signal. In the case of wideangle film, the circuit 64 controls data read-out so that not all of the stored signals are read out to the circuit 66. The selection has the effect of reducing the aspect ratio of the image (at the expense of losing part of its width) to the ratio required for display on a television screen. A manually operable control 68 determines which signals are selected and, therefore, which part of the width of the image is selected for display. The control 68 enables the choice to change, as action moves across the frame, so that the final image can, in effect, pan across the full image on the film, to follow the action.

Selection is also performed when anamorphic film is being encoded. The two halves of the line of cells are connected, and 1440 signals arrive for each line of the image. These are all stored in the store 62. The circuit 64 controls data read-out so that only 720 consecutive signals are read from the store to the circuit 66, corresponding to the half of the image width which is to be displayed. The control 68 is again used to determine which signals are to be read out, so that the choice may be changed to pan the final image across the whole width of the anamorphic image to follow moving action.

Although the sensor described above has 1440 elements, another number of elements could be chosen, according to factors such as the required resolution and the degree of anamorphism (the horizontal compression ratio) of the film being projected. Future developments in CCD technology, for instance any which increases the maximum acceptable clock rate, will also affect the choice of the number of elements chosen and the position of the switch 28 along the line of cells. Further switches like the switch 28 may be provided along the line of cells, to enable the line to have more than two effective lengths, if required by the range of film stock to be encoded.

The invention is applicable not only to the CCDs of the type described above. Indeed the sensor need not necessarily be a charge coupled device. The problem addressed by the invention arises from the requirement that signals be read out of the sensor in serial form, and the invention could also be applicable to other sensor systems in which the same requirement exists.

I claim:

1. A telecine projector sensor comprising a plurality of photosensitive cells arranged in a line for the receipt of a projected film image, each of said cells receiving a respective portion of said image and comprising means operable to generate and store a signal representing said respective portion of said image, said sensor further comprising an output port and shifting means operable to shift generated signals along said line of said cells to said output port, said generated signals being readable through said output port in serial form as they arrive at said output port, and said sensor further comprising disconnecting means operable to connect or to disconnect portions of said line of said cells, said portions of said sensor being respectively adjacent said output port and away from said output port, whereby operation of said disconnecting means allows signals to be read through said output port selectively from the whole of said line of said cells or from only said adjacent portion of said line of said cells.

2. A sensor according to claim 1, further comprising a chargecoupled device, and said signals being packets of electric charge.

3. A sensor according to claim 2, wherein said disconnecting means comprises a current sink operable to absorb discarded signals from said portion of said line away from said output port, when said portions are disconnected.

4. A sensor according to claim 1, further comprising storage means operable to store signals read through said output port, selecting means operable to select a portion of said signals stored in said storage means, and video signal generating means operable to encode as a video signal said selected portion of said signals.

* * * * *